US005272006A

United States Patent [19]

Maine

[11] Patent Number: 5,272,006

[45] Date of Patent: Dec. 21, 1993

[54] MATRIX BOARD MATERIAL AND MOLD AND A METHOD FOR MAKING PRINTING PLATES THEREFROM

[75] Inventor: Richard L. Maine, North Windham, Conn.

[73] Assignee: Lydall, Inc., Manchester, Conn.

[21] Appl. No.: 13,988

[22] Filed: Feb. 5, 1993

Related U.S. Application Data

[63] Continuation of Ser. No. 751,720, Aug. 29, 1991, abandoned.

[51] Int. Cl.[5] .......................... D02G 3/00; B32B 3/00

[52] U.S. Cl. .................................... 428/396; 428/908; 428/156; 264/220; 264/319; 101/16; 101/401.2

[58] Field of Search ................ 428/908, 396; 264/220, 264/319; 101/16, 401.2

[56] References Cited

U.S. PATENT DOCUMENTS

| | | | |
|---|---|---|---|
| 3,570,400 | 3/1971 | Squitieri et al. | 428/187 |
| 3,668,058 | 6/1972 | Pappadakis | 428/506 |
| 4,095,008 | 6/1978 | Sundstrom et al. | 428/215 |
| 4,137,363 | 1/1979 | Maron et al. | 428/338 |

*Primary Examiner*—George F. Lesmes
*Assistant Examiner*—Chris Raimund
*Attorney, Agent, or Firm*—Griffin, Butler, Whisenhunt & Kurtossy

[57] ABSTRACT

A low fiber, high filler content matrix board is provided. The matrix board is characterized by a total mold shrinkage of not more than 0.002 "/", wherein the shrinkage is substantially non-directional. In addition to the fibers and fillers, the board further comprises a resin binder. A matrix mold made from the board is provided together with a method for forming a flexographic printing plate from such a matrix mold and a printing plate made according to this method.

12 Claims, No Drawings

MATRIX BOARD MATERIAL AND MOLD AND A METHOD FOR MAKING PRINTING PLATES THEREFROM

This application is a continuation, of Ser. No. 07/751,720, filed Aug. 29, 1991, now abandoned.

BACKGROUND OF THE INVENTION

The present invention relates to the field of matrix materials used in the manufacture of printing plates. More particularly, the present invention relates to a low fiber, high filler content matrix board used to form a matrix hold which is then employed in the manufacture of flexographic printing plates.

Matrix boards for use in forming flexographic printing plates are commonly manufactured by a paper making process on standard paperboard making equipment. Once the matrix board has been made, impressions are formed in the board by means of a master engraving plate. The impressioning is usually accomplished by pressing the matrix board against the master plate at relatively high pressure to form a mold. Engraved metal plates are commonly used as the masters from which the molds are formed; however, masters formed from rubber or photopolymer materials are also used.

Early matrix boards contained asbestos fibers which helped to reduce shrinkage of the board during the molding operation. However, since the asbestos fibers were present at relatively high loadings (30–60%) and were oriented by the paper machine in the machine direction, the resulting board presented highly directional shrinkage characteristics. That is, shrinkage along one axis of the board significantly exceeds that which occurs along the board's other axis.

Asbestos-free matrix boards became available in the early 1980's. In such matrix boards the asbestos fibers are replaced by cellulose fibers which, again, are present at relatively high loadings. Since cellulose fibers shrink more than asbestos and are also oriented in the machine direction during the manufacturing process, the asbestos-free boards are characterized by even higher directionality than boards formed with asbestos fibers.

Less directional matrix board materials made from cross-plied laminations of thin layers are known to those skilled in the art. However, because such materials contain a relatively high content of cellulosic fibers, they still exhibit significant shrinkage.

In addition to the shrinkage problem associated with matrix boards having a high fiber content, high mold pressures are generally required to mold faithful reproductions of the master plate into such boards. This is so because the high fiber content of these boards tends to reinforce the matrix and cause it to resist deformation. Accordingly, mold pressures of at least 300 psi are typical. Such high pressures tend not only to distort rubber and photopolymer masters but also compound the high shrinkage of such boards.

Accordingly, it is an object of the present invention to provide a low molding pressure matrix board material which exhibits low overall shrinkage and substantially less directional shrinkage.

It is another object of the present invention to provide such a matrix board material which can be formed on standard paperboard making equipment.

It is a still further object of the invention to provide a mold made from the above-described matrix board and a method for forming a flexographic printing plate from such a mold.

SUMMARY OF THE INVENTION

The present invention meets these and other objects which will become readily apparent from what follows by providing a low fiber, high filler content matrix board which further includes a resin binder. When subjected to molding, the matrix board exhibits not only very low total mold shrinkage, less than 0.002 "/", but also shrinkage which is substantially non-directional. The total fiber content of the board does not exceed 20% by weight, and the board's total filler content may be as high as 65% by weight.

The matrix board according to the invention may be manufactured on standard paperboard making equipment and preferably comprises by weight percent: 5–20% fibers, 50–65% fillers and 25–40% resin.

The present invention further provides a matrix mold used in the manufacture of flexographic printing plates. The matrix mold comprises a low fiber, high resin content matrix board with a three-dimensional impression engraved thereon. A method for forming a flexographic printing plate from such a matrix mold and a printing plate made according to this method are also provided.

DETAILED DESCRIPTION OF THE INVENTION

A matrix board taught by the present invention comprises 5–20% fibers. The fiber component includes, by weight of the board, 2–15% of small diameter fibers suitable for retaining finely divided particulate material such as the inorganic particulate fillers also included in the board's composition. Preferably, these small diameter fibers have a diameter of less than about 3–4 microns and are fibrils derived from refined cellulose fibers. Any source of virgin or secondary cellulose fibers may be utilized; however, cellulose fibrils derived from wood pulp known to those skilled in the art as bleached softwood pulp have been found to be particularly suitable. It should be understood that the present invention is in no way limited in this regard and any fibers having a diameter less than about 3–4 microns may be utilized. For example, polyester fibers such as those available under the trademark "TEPYRUS" TM04N from Teijin, Ltd. have also been found to be particularly suitable.

In addition to the small diameter fibers, the fiber component also includes, by weight of the final product, 0–10% organic fibers. Almost any organic fiber may be used such as, for example, polyesters fibers, aramid fibers, acrylic fibers, nylon fibers, PVA fibers or mixtures of such fibers. The remainder of the fiber component is made up of inorganic fibers. Suitable inorganic fibers include, for example, microglass fibers, chopped strand glass fibers, mineral wool fibers, rock wool fibers, ceramic fibers and mixtures of such fibers. In the most preferred embodiment of the invention ¼", ⅛" or No. 612 glass fibers available from PPG or Evanite Corp. are used.

The low fiber content of the matrix board is complemented by a filler content which may be as high as 65 wt. % of the final product. The filler not only provides the matrix board with sufficient bulk and strength, but also enhances the board's ability to reproduce the impression from the master as the resin in the board softens and flows under the heat and pressure present during pressing. Thus, the relatively high filler content of the board enables flat, stable molds to be produced at molding pressures as low as 100 psi and temperatures, in the range of from about 300° F. to about 310° F.

Almost any filler well known to those skilled in the art may be employed such as, for example, diatomaceous earth, clay, silica, talc, mica, calcium carbonate or mixtures of these fillers. In the preferred embodiments of the invention, the filler is a combination of mica and calcium carbonate.

The present invention further comprises 25–40% resin. Typically, a thermoset resin or a combination of such resins are employed. Preferably, a phenolic resin such as those known to persons skilled in the art as "resoles" or "novalacs" are used. However, other thermoset resins may be employed such as, for example, urea formaldehyde, melamine and epoxy resins. Latex binders may also be employed. For example, nitrile, acrylic and styrene-butadiene latices have been found useful either alone, in combination with one another or in combination with one or more of the previously mentioned thermoset resins. As set forth in the examples, in one preferred embodiment of the invention, the resin is a phenolic resin sold under the trademark "BAKELITE" and available from OXY-CHEM. In a second preferred embodiment the above-identified resin is used in combination with a nitrile latex resin.

The matrix board may be formed in a wet-layed process on a cylinder machine or any other type of standard paperboard making equipment well known to those skilled in the art. The furnish from which the board is formed is a uniform mixture of the fiber, resin and filler components. The matrix board is formed in sheets from the uniformly mixed furnish and then dried and finished. The following examples illustrate matrix boards made in accordance with the invention:

EXAMPLE I

| component | wt. % |
|---|---|
| fibrillated cellulose fibers | 2.0 |
| polyester fibers (less than 4 microns) | 1.0 |
| ¼" glass fibers | 5.1 |
| mica | 25.5 |
| calcium carbonate | 34.0 |
| phenolic resin | 26.0 |
| nitrile latex resin | 3.1 |

EXAMPLE II

| component | wt. % |
|---|---|
| polyester fibers (less than 4 microns) | 2.0 |
| ¼" glass fibers | 6.0 |
| mica | 28.0 |
| calcium carbonate | 30.0 |
| phenolic resin | 30.0 |
| nitrile latex | 4.0 |

Examples I and II exhibit the following properties upon molding:

| property | Ex. I | Ex. II |
|---|---|---|
| density #/in$^3$ | .0555 | .0544 |
| tensile MD (psi) | 5242 | 8322 |
| tensile CD (psi) | 3775 | 5379 |
| flex MD (psi) | 10246 | 12379 |
| flex CD (psi) | 6679 | 9855 |
| flex mod. MD (psi) | 2.086 | ? |
| flex mod. CD (psi) | 1.486 | ? |
| shrink MD #/in$^3$ | .0005 | .0006 |
| shrink CD #/in$^3$ | .0007 | .0007 |

After the low fiber, high filler content matrix board is formed it is used to make a matrix mold. The board is first coated with a release agent and then loaded into a press together with a photopolymer, rubber or metal master engraving plate. The matrix board is preheated in the press to a temperature in the range of about 190° F. to 210° F. for approximately 60 seconds. The board is then pressed against the master under a pressure in the range of about 100 to 1000 psi and at a temperature of about 300° F. to 310° F. for approximately ten minutes to emboss the engraving on the master into the board. As a result of this treatment, the resin in the matrix board cures and a rigid matrix mold is obtained. The rigid matrix mold may then be filled with a molding compound in the typical manner to form a flexographic printing plate.

While preferred embodiments have been shown and described, various modifications and substitutions may be made without departing from the spirit and scope of the invention. Accordingly, it is to be understood that the present invention has been described by way of example and not by limitation.

I claim:

1. A matrix mold used in the manufacture of flexographic printing plates, said mold comprising a low fiber, high filler content matrix board with a three-dimensional impression engraved thereon, said matrix board including 5% to 20% fibers wherein 2–15% are small diameter fibers, 50% to 65% fillers and 25% to 40% resin binder, said matrix board further characterized by a total mold shrinkage of less than 0.002 inch/inch, wherein said mold shrinkage is substantially non-directional.

2. The matrix mold of claim 1 wherein said small diameter fibers have a diameter of 3–4 microns and are suitable for retaining finely divided particulate material.

3. The matrix mold of claim 2 wherein said small diameter fibers are cellulose fibrils.

4. The matrix mold of claim 2 wherein said fibers further comprise organic fibers selected from the group consisting of polyester fibers, aramid fibers, nylon fibers, acrylic fibers, PVA fibers and mixtures thereof.

5. The matrix mold of claim 2 wherein said fibers further comprise inorganic fibers selected from the group consisting of chopped strand glass fibers, microglass fibers, mineral wool fibers, rock wool fibers, ceramic fibers, carbon fibers and mixtures thereof.

6. The matrix mold of claim 1 wherein the resin is selected from the group consisting of phenolic resins, urea formaldehyde resins, melamine resins, epoxy resins, latex resins and mixtures thereof.

7. The matrix mold of claim 6 wherein the resin comprises a phenolic resin selected from the group consisting of resoles, novalacs and mixtures thereof.

8. The matrix mold of claim 6 wherein the resin comprises a latex resin selected from the group consisting of nitrile resins, acrylic resins and styrene-butadiene resins.

9. The matrix mold of claim 1 wherein the fillers are selected from the group consisting of diatomaceous earth, clay, mica, calcium carbonate, silica, talc and mixtures thereof.

10. The matrix mold of claim 2 wherein the small diameter fibers are fibrils.

11. The matrix mold of claim 1 wherein said matrix mold has a filler to fiber ratio not substantially less than 2.5 to 1.

12. A method for making a flexographic printing plate, said method comprising the steps of:

providing a low fiber, high filler content matrix board including 5% to 20% fibers wherein 2–15% are small diameters fibers, 50% to 65% fillers and 25% to 40% resin binder, said matrix board further characterized by a total mold shrinkage of less than 0.002 inch/inch, wherein said mold shrinkage is substantially non-directional;

loading said matrix board together with a master engraving plate into a press;

closing the press and preheating the matrix board to a temperature in the range of about 190° F. to about 210° F.;

forming a rigid matrix mold by pressing the matrix board against the master under a pressure in the range of from about 100 to about 1000 psi and at a temperature of from about 300° F. to about 310° F. to emboss the engraving on the master into the board and to cure the resin in the matrix board; and filling the mold with a molding material to form a flexographic printing plate.

* * * * *